United States Patent [19]

St. Aubyn

[11] Patent Number: 5,191,191

[45] Date of Patent: Mar. 2, 1993

[54] LOGIC CIRCUIT AND METHOD FOR CONTROLLING THE POWER SUPPLY OF AN IRONING SYSTEM

[75] Inventor: Nicholas F. St. Aubyn, Truro, United Kingdom

[73] Assignee: Gemini Clothescare Limited, Cornwall, United Kingdom

[21] Appl. No.: 665,941

[22] Filed: Feb. 28, 1991

[30] Foreign Application Priority Data

Mar. 1, 1990 [GB] United Kingdom ............... 9004614
Feb. 19, 1991 [GB] United Kingdom ............... 9103461

[51] Int. Cl.$^5$ ............................................. H05B 1/02
[52] U.S. Cl. ..................................... 219/485; 219/485; 219/486; 219/497; 219/501; 219/250; 219/247
[58] Field of Search ............... 219/483, 485, 486, 501, 219/506, 497, 508-510, 491-493, 247-251

[56] References Cited

U.S. PATENT DOCUMENTS

| | | | |
|---|---|---|---|
| 3,866,019 | 2/1975 | Cartier | 219/501 |
| 4,100,428 | 7/1978 | Delisle et al. | 219/485 |
| 4,160,153 | 7/1979 | Melander | 219/485 |
| 5,021,637 | 6/1991 | Perala et al. | 219/485 |

Primary Examiner—Mark H. Paschall
Attorney, Agent, or Firm—Larson and Taylor

[57] ABSTRACT

An electrical logic circuit for incorporation in the common power supply system of an appliance including a plurality of electrical components which have intermittent power requirements comprises a system for designating the components as dominant and subsidiary components and circuitry to direct power to the dominant component preferentially and to the or a subsidiary component only in dependence on the instantaneous power requirement of the or a more dominant component. The logic circuit may include a standby facility to direct power selectively to the subsidiary component. The invention may be applied to an ironing system including a heatable iron as the dominant component and a heatable board as the subsidiary component.

4 Claims, 2 Drawing Sheets

LOGIC CIRCUIT AND METHOD FOR CONTROLLING THE POWER SUPPLY OF AN IRONING SYSTEM

FIELD OF THE INVENTION

This invention relates to an electrical logic circuit for incorporation in a common power supply system to a plurality of electrical components.

BACKGROUND OF THE INVENTION

Certain electric appliances comprise a plurality of components. In the case of domestic electrical appliances, an example is an ironing system such as disclosed in European Patent No. 0126530, which discloses a heatable ironing board and a heatable iron for use therewith, the control circuitry for both the board and the iron being contained within the board and powered from a common supply. A further arrangement is disclosed in WO90/00642.

When such an appliance is initially switched on, electrical power is required to be supplied both to the board and to the iron and, where this occurs simultaneously, a heavy power requirement is imposed. In countries where the normal domestic power supply is rated at 240 volts or thereabouts, adequate power is available for this requirement. However, in countries where the normal domestic supply is only 110 volts or thereabouts, insufficient power may be available.

SUMMARY OF THE INVENTION

It is an object of the present invention to provide a logic circuit for selectively supplying electrical power to one of a plurality of electrical components which derive their power from a common source.

According to the invention, an electrical logic circuit for incorporation in the common power supply system of an appliance including a plurality of electrical components which have intermittent power requirements comprises means for designating the components as dominant and subsidiary components and means to direct power to the dominant component preferentially and to the or a subsidiary component only in dependence on the instantaneous power requirement of the or a more dominant component.

Preferably, the logic circuit according to the invention also includes a standby facility by means of which power is selectively directed only to the or a subsidiary component, irrespective of the requirement of the dominant or more dominant component.

The components may be heatable and the power may be supplied for the purpose of energising a heater element in each component which may be user-programmable so that the component or a part thereof is heated to and maintained at or near a predetermined operating temperature, by for example a thermostatic or electronic control circuitry. Therefore, using a logic circuit according to the invention, the dominant component receives power as and when it is required, as determined by the control circuity, and the or a subsidiary component receives power as and when it is required, subject to the supply to the dominant component.

The invention may be applied to an ironing system of the type described, which may comprise a cordless iron, in which the iron heater is designated as the dominant component and the board heater is designated as the subsidiary component. A standby facility is incorporated for preferential selection of the board heater unless and until a temperature requirement is programmed to the control circuit by the user and which over-rides the standby control.

BRIEF DESCRIPTION OF THE DRAWINGS

Embodiments of the invention will now be illustrated by way of example with reference to accompanying drawings, of which.

DESCRIPTION OF THE PREFERRED EMBODIMENTS

A typical operating sequence for an ironing system is described hereafter, by way of example:

a. Unit is plugged into mains and mains is connected at source.

b. Control circuit goes to standby mode; board starts heating to "Cool" setting.

c. User selects "Cotton" setting. Board power switches off and iron power switches on.

d. Iron reaches "Cotton" temperature setting and power to iron switches off. Board power switches back on.

e. Iron is removed from dock, board continues to heat up towards "Cotton" setting.

f. Iron is replaced in dock, and needs re-heating. Board power switches off, iron-heats (a few seconds) and switches off; board power switches on.

g. Board reaches "Cotton" setting and switches off. Iron and board are both now in a "recharge" state where power use will typically be only 6% of time for the iron and 20% of time for the board.

h. Iron is left in stand for ten minutes while user is absent. Control circuit reverts to standby mode after five minutes, iron switches off, but heat to board is maintained at "Cool" setting.

i. At the end of the ironing session, user selects standby mode, but leaves the power source connected. Iron switches off, board continues in "recharge" stage at "Cool" setting until 15 minutes have expired and then switches off.

According to the invention and as seen from the above example, power consumption is limited to the iron or the board and hence does not exceed the power rating of the higher of them at any given time.

The invention also includes a method for controlling the operation of an electrical appliance including a plurality of electrical components which have intermittent power requirements and a common power supply, the method comprising incorporating in the control circuitry a logic circuit whereby power is supplied preferentially to a component designated as a dominant component and to the or a component designated as a subsidiary component only in dependence on the instantaneous power requirement of the or a more dominant component.

Figure 1:
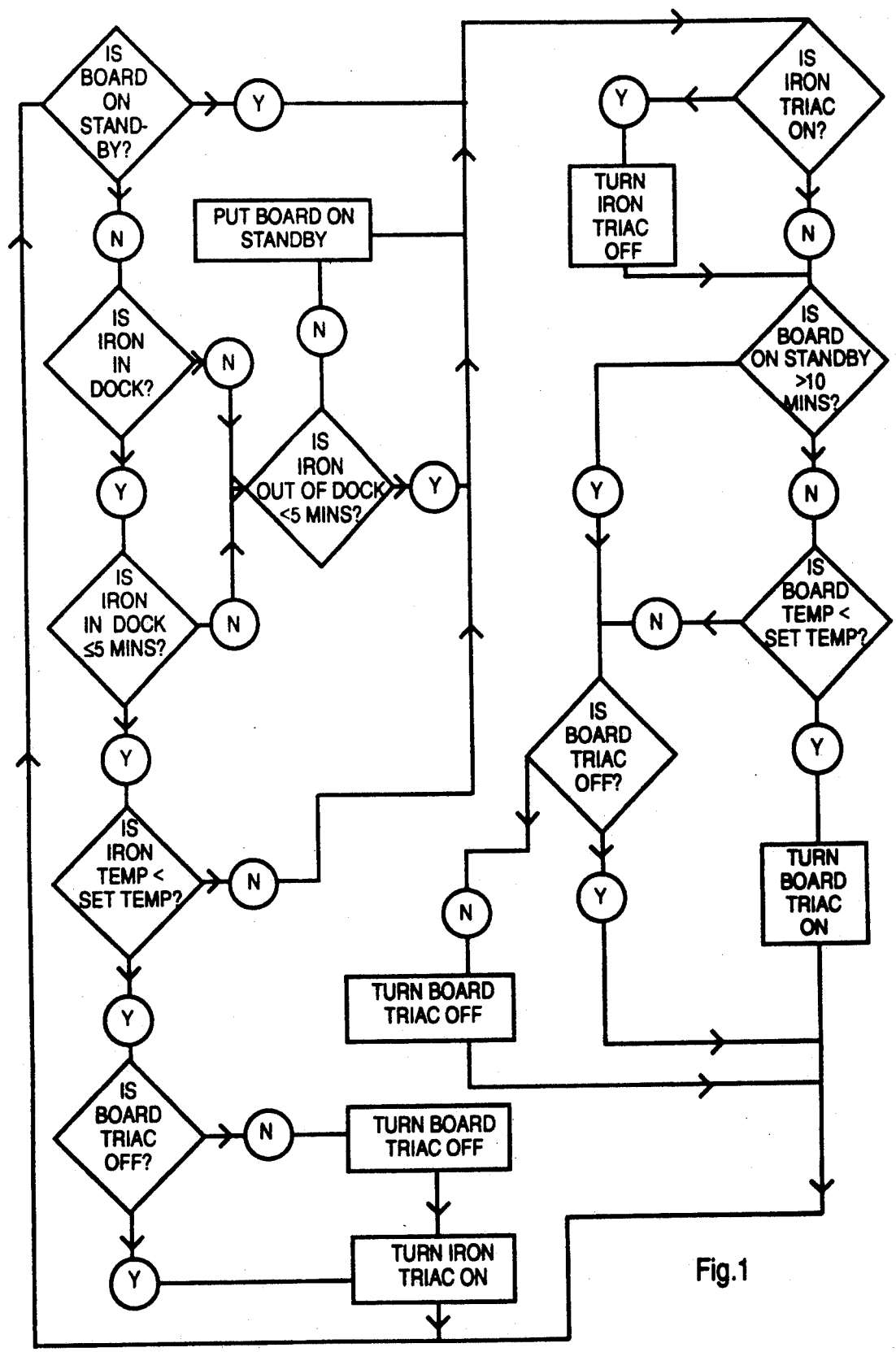
FIG. 1 is a flow diagram showing a logic circuit suitable for incorporating in a chip as a part of an overall control circuit for an ironing system comprising of a heatable ironing board and a heatable iron, both powered from a common supply.
Figure 2:
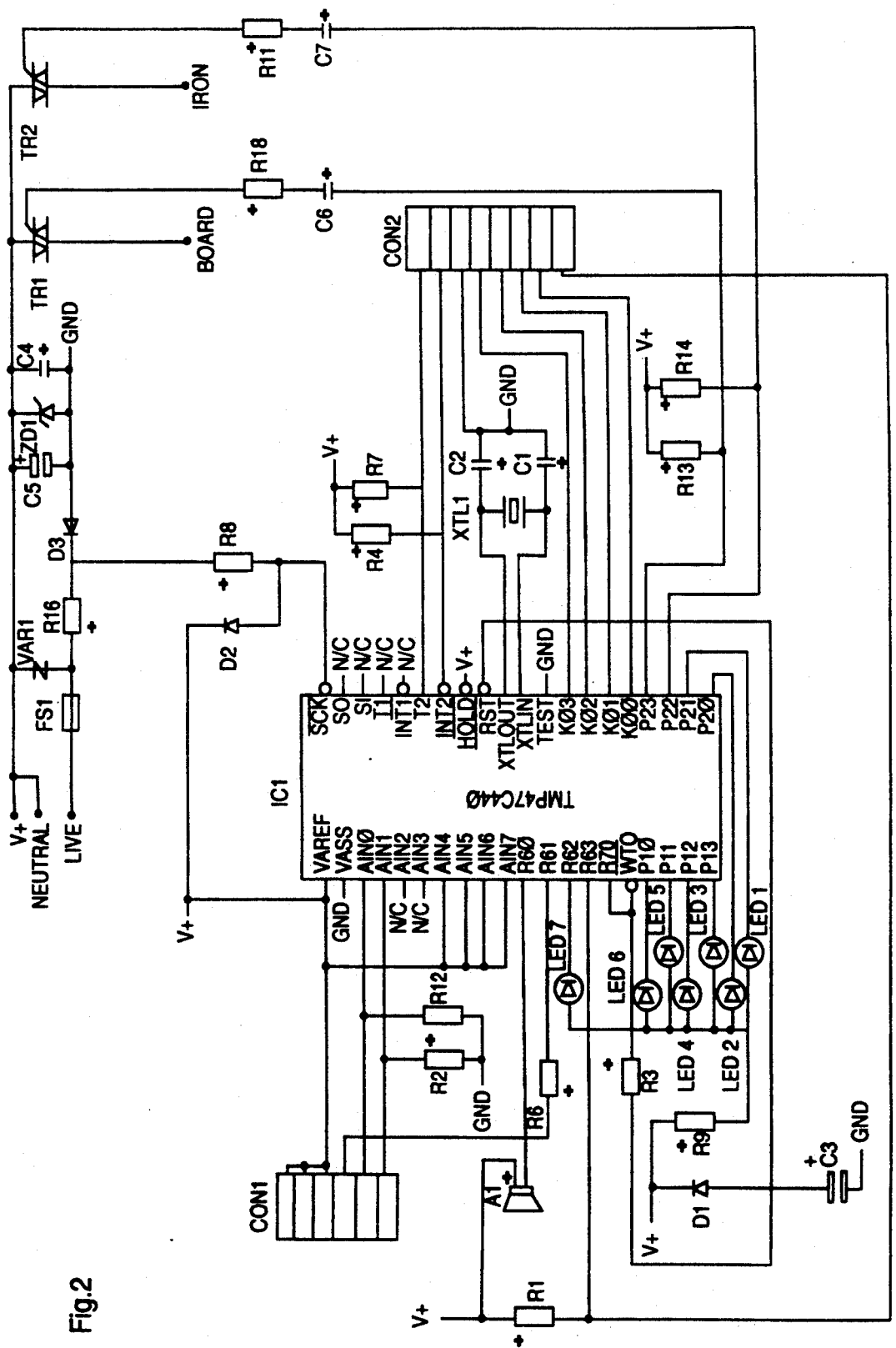
FIG. 2 is a circuit diagram of a control circuit suitable for incorporating in a chip and programmed with the logic steps as illustrated in FIG. 1.

In FIG. 1, a standby facility is included in the logic circuit to direct power selectively to the board heater, which is the subsidiary component. The iron heater is normally the dominant component. Power switching is performed by means of triacs. In the figure, a "Y" designates a positive response and a "N" designates a negative response. The iron is a cordless iron and references to the iron being in the dock relate to the iron being placed in position on a support whereby it can receive electrical power for heating purposes, as more fully described in WO 90/00642.

I claim:

1. An electrical logic circuit for incorporation in the common power supply system of an ironing system including a plurality of electrical components which have intermittent power requirements, which components include an electrically heatable iron and an electrically heatable ironing board, the circuit comprising means for designating at least one of the components as a dominant component and at least one of the components as a subsidiary component; and means to direct power to the dominant component preferentially and to the subsidiary component only in dependence on the instantaneous power requirement of the dominant component.

2. A logic circuit according to claim 1, further including a standby facility by means of which power is selectively directed only to the subsidiary component irrespective of the requirement of the dominant or more dominant component.

3. A logic circuit according to claim 1, in which the components are heatable and the operating temperatures thereof are user-programmable.

4. A logic circuit according to claim 1, in which the ironing board includes a board heater and the iron includes an iron heater; and in which the iron heater is designated as the dominant component and the ironing board heater is designated as the subsidiary component.

* * * * *